US012118588B2

(12) United States Patent
MacNeille et al.

(10) Patent No.: US 12,118,588 B2
(45) Date of Patent: Oct. 15, 2024

(54) METHOD AND SYSTEM FOR ADVERTISING ON SHUTTLE SERVICES (71) Applicant: Ford Global Technologies, LLC, Dearborn, MI (US)

(72) Inventors: Perry Robinson MacNeille, Lathrup Village, MI (US); Yimin Liu, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1127 days.

(21) Appl. No.: 16/960,143

(22) PCT Filed: Jan. 15, 2018

(86) PCT No.: PCT/US2018/013734
§ 371 (c)(1),
(2) Date: Jul. 6, 2020

(87) PCT Pub. No.: WO2019/139628
PCT Pub. Date: Jul. 18, 2019

(65) Prior Publication Data
US 2021/0125226 A1    Apr. 29, 2021

(51) Int. Cl.
*G08G 1/0968* (2006.01)
*B60W 60/00* (2020.01)
(Continued)

(52) U.S. Cl.
CPC ... *G06Q 30/0265* (2013.01); *B60W 60/00253* (2020.02); *G01C 21/3476* (2013.01);
(Continued)

(58) Field of Classification Search
CPC ............ G06Q 30/0265; G06Q 10/047; G06Q 30/0273; G06Q 50/30; G06Q 30/0201;
(Continued)

(56) References Cited

U.S. PATENT DOCUMENTS 8,630,897 B1   1/2014 Prada Gomez et al.
9,571,968 B1   2/2017 Barron et al.
(Continued)

FOREIGN PATENT DOCUMENTS

CN   106530009 A    3/2017
KR   20150009078 A  1/2015
RU      42680 U1    12/2004

OTHER PUBLICATIONS

Goldkuhl et al., "Sensing the scent of service success," 2007, European Journal of Marketing, vol. 41 No. 11/12 (Year: 2007).*
(Continued)

*Primary Examiner* — Adam R Mott
*Assistant Examiner* — Byron Xavier Kasper
(74) *Attorney, Agent, or Firm* — Emily Drake; Brooks Kushman P.C.

(57) ABSTRACT

An advertising method for a shuttle comprises by a controller, responsive to identifying a drop-off location and a business paying to influence a route traveled by the shuttle, selecting one of a plurality of routes to the drop-off location according to a priming estimate indicating that points of interest along the one share more characteristics with the business relative to others of the plurality; and commanding the shuttle to travel the one.

12 Claims, 3 Drawing Sheets

(51) Int. Cl.

| | |
|---|---|
| *G01C 21/34* | (2006.01) |
| *G06Q 10/02* | (2012.01) |
| *G06Q 10/047* | (2023.01) |
| *G06Q 30/02* | (2023.01) |
| *G06Q 30/0201* | (2023.01) |
| *G06Q 30/0251* | (2023.01) |
| *G06Q 30/0273* | (2023.01) |
| *G06Q 50/40* | (2024.01) |
| *G08G 1/133* | (2006.01) |
| *H04W 4/021* | (2018.01) |
| *G05D 1/00* | (2006.01) |

(52) U.S. Cl.
CPC ....... *G06Q 10/047* (2013.01); *G06Q 30/0273* (2013.01); *G06Q 50/40* (2024.01); *G08G 1/133* (2013.01); *G05D 1/0088* (2013.01)

(58) Field of Classification Search
CPC ............... G06Q 30/0206; G06Q 10/02; G06Q 30/0266; G06Q 30/00; G06Q 30/0633; G06Q 10/00; G06Q 30/012; G06Q 30/02; G06Q 30/0253; G06Q 30/08; G06Q 30/0241; B60W 60/00253; G01C 21/3476; G01C 21/34; G01C 21/26; G01C 21/3423; G08G 1/133; G08G 1/096833; G08G 1/202; G08G 1/096775; G05D 1/0088; G05D 2201/0213; H04W 4/021; H04W 4/40; H04W 76/11; H04W 12/088; H04W 36/34; H04L 64/00; H04L 67/10; H04L 67/12; G06F 3/017; G06F 16/25; G06F 16/951; G06V 40/0168; B60R 25/00; B60R 25/1004; G08B 25/016; B60Q 1/52
See application file for complete search history.

(56) References Cited

U.S. PATENT DOCUMENTS

| | | | |
|---|---|---|---|
| 2009/0222345 A1 | 9/2009 | Greene | |
| 2009/0287408 A1 | 11/2009 | Gerdes et al. | |
| 2011/0320275 A1* | 12/2011 | O'Sullivan | G06Q 30/0255 705/14.66 |
| 2012/0054028 A1* | 3/2012 | Tengler | G06Q 30/02 701/438 |
| 2013/0007058 A1 | 1/2013 | Meredith et al. | |
| 2014/0310103 A1 | 10/2014 | Ricci | |
| 2015/0206181 A1* | 7/2015 | Parundekar | G06Q 30/0261 705/14.49 |
| 2015/0348112 A1* | 12/2015 | Ramanujam | G06Q 30/0266 705/14.63 |

OTHER PUBLICATIONS

International Search Report of the International Searching Authority for PCT/US2018/013734 with mailing date of Jun. 15, 2018.
Ride-Hailing Cab App Drivers Want to Earn More by Displaying Ads in The Car. http://www.operr.com/blog/index.php/ride-hailing-app-drivers-displaying-ads/ Feb. 16, 2017. 3 pages.
Amadeo, Ron. Google patents ad-powered taxi service that would offer free rides to shoppers. ARS Technica. https://arstechnica.com/gadgets/2014/01/google-patents-ad-powered-taxi-service-that-would-offer-free-rides-to-shoppers/ Jan. 24, 2014. 5 pages.

* cited by examiner

METHOD AND SYSTEM FOR ADVERTISING ON SHUTTLE SERVICES

TECHNICAL FIELD

The present disclosure is generally related to a method and system for advertising on a shuttle bus.

BACKGROUND

Mobile hailing shuttle services have become increasingly popular due to its convenience and efficiency. A passenger may order a shuttle using a mobile application by specifying pickup and drop-off locations. This may create advertising opportunities for businesses.

SUMMARY

In one or more illustrative embodiments, an advertising method for a shuttle comprises by a controller, responsive to identifying a drop-off location and a business paying to influence a route traveled by the shuttle, selecting one of a plurality of routes to the drop-off location according to a priming estimate indicating that points of interest along the one share more characteristics with the business relative to others of the plurality; and commanding the shuttle to travel the one.

In one or more illustrative embodiments, a routing server for a shuttle comprises a controller programmed to, responsive to identifying a drop-off location for a passenger, a preference of the passenger, and a business paying to influence a route traveled by the shuttle, select one of a plurality of routes to the drop-off location according to the preference and a priming estimate indicating an extent to which points of interest along the one share characteristics with the business relative to others of the plurality, and provide instructions to the shuttle such that the shuttle travels the one.

In one or more illustrative embodiments, a vehicle comprises a processor, programmed to receive pickup and drop-off locations of a passenger; negotiate contracts with businesses near the drop-off location; responsive to the contracts, calculate priming estimates for points of interest indicative of effectiveness of promoting contracted businesses; and responsive to the priming estimates, create a route contained in a geographic area reachable by the shuttle within a time constraint defined by the pickup and drop-off locations.

The details of one or more implementations are set forth in the accompanying drawings and the description below. Other features and advantages will become apparent from the description, the drawings, and the claims.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

The present disclosure, among other things, proposes an advertising system for mobile hailing shuttle services. A location-based media system is installed on a shuttle bus in wireless communication with a remote server. A passenger may order shuttle services and reserve a seat using a mobile application. The order information, along with the passenger's preferences, are sent to the location-based media system on the shuttle. The passengers of the shuttle are a "serviceable available market" defined by the passenger manifest. Market analysis is used to define target groups within the available market based on available product advertisements. Local businesses may make offers digitally to the shuttle to advertise their businesses. The shuttle media system may negotiate and enter into instant contracts with the businesses using the passenger's order. The shuttle may promote contracted businesses by creating a theme route related to the advertisers' business to prime/influence the passengers to increase their chance to purchase at the end of the ride.

Figure 1:
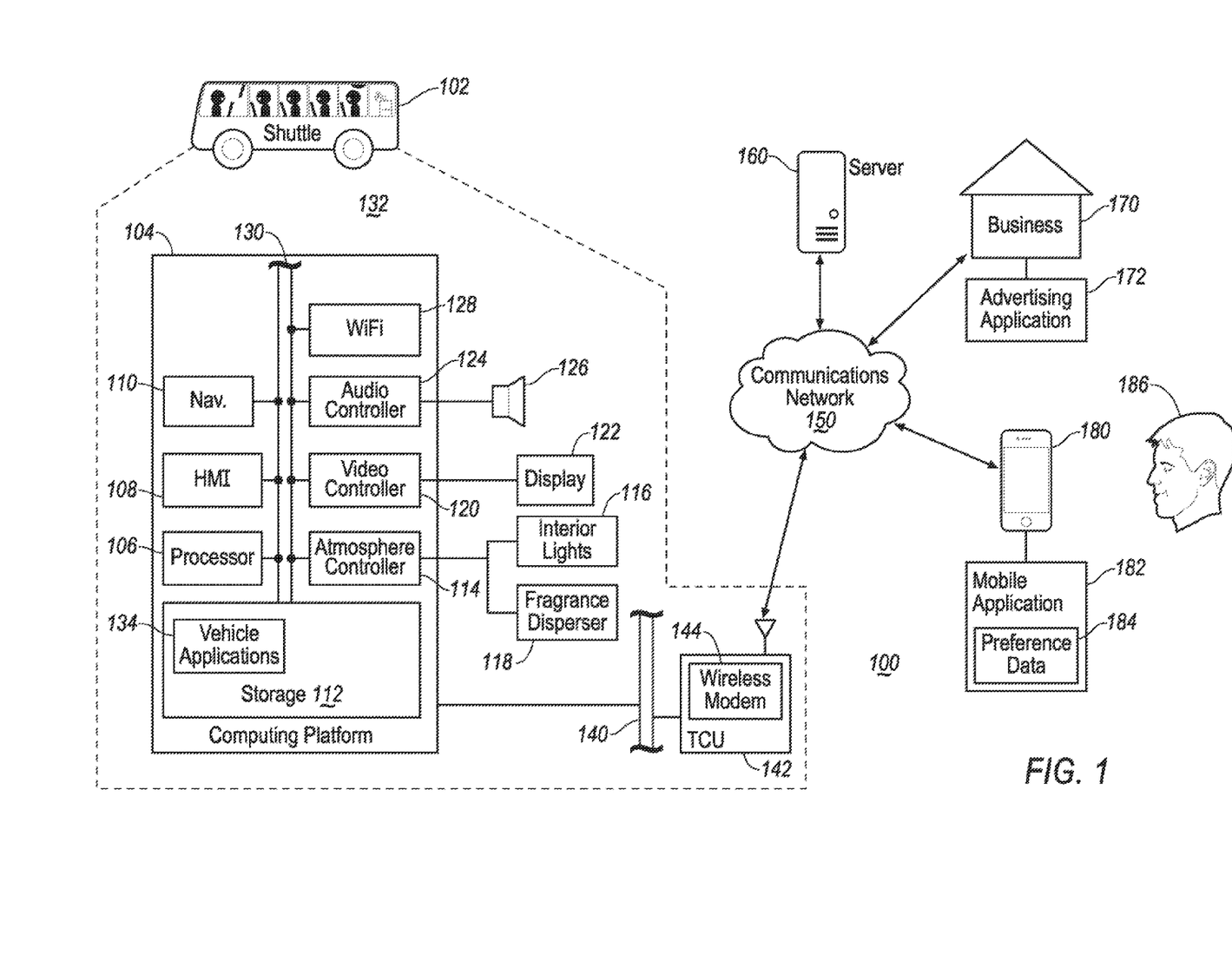
FIG. 1 illustrates an example block topology of an advertising system of one embodiment of the present disclosure.

Referring to FIG. 1, an example topology block diagram of an advertising system 100 for a shuttle 102 is illustrated. The shuttle 102 may include various types of automobile, bus, coach, truck, crossover utility vehicle (CUV), sport utility vehicle (SUV), recreational vehicle (RV), or other mobile machine for transporting people. In many cases, the shuttle 102 may be powered by an internal combustion engine. As another possibility, the vehicle 102 may be a hybrid electric vehicle (HEV) powered by both an internal combustion engine and one or move electric motors, such as a series hybrid electric vehicle (SHEV), a parallel hybrid electric vehicle (PHEV), or a parallel/series hybrid vehicle (PSHEV). In an example, the shuttle 102 may be a traditional vehicle operated by a human driver. Alternatively, the shuttle 102 may include an autonomous driving mechanism partially or fully operating the vehicle with or without human intervention. It should be noted that the illustrated system 100 is merely an example, and more, fewer, and/or differently located elements may be used.

A vehicle system 132 (also known as location-based media system) of the shuttle 102 mainly includes a computing platform 104, and a telematics control unit (TCU) 142 in communication with each other via one or more in-vehicle network 140. The in-vehicle network 140 may include, but is not limited to, one or more of a controller area network (CAN), an Ethernet network, and a media oriented system transport (MOST), as some examples. In an example, the vehicle system 132 may include the SYNC system manufactured by The Ford Motor Company of Dearborn, Mich.

The computing platform 104 may include one or more processors 106 configured to perform instructions, commands, and other routines in support of the processes described herein. For instance, the computing platform 104 may be configured to execute instructions of vehicle applications 134 to provide features such as navigation, shuttle reservation, and contract negotiation. Such instructions and other data may be maintained in non-volatile manner using a variety of types of computer-readable storage medium 112. The computer-readable medium 112 (also referred to as a processor-readable medium or storage) includes any non-transitory medium (e.g., tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Various components of the computing platform 104 may be further configured to communicate with each other via a platform network 130. In an example, the platform network 130 may be a sub-set of the in-vehicle network 150. Alternatively, the platform network 130 may be an independent network separated from the in-vehicle network 150.

The computing platform 104 may be provided with various features allowing the vehicle occupants/users to interface with the computing platform 104. For example, the computing platform 104 may receive input from human-machine interface (HMI) controls 108 configured to provide for occupant interaction with the vehicle 102. As an example, the computing platform 104 may interface with one or more buttons (not shown) or other HMI controls configured to invoke functions on the computing platform 104 (e.g., steering wheel audio buttons, a push-to-talk button, instrument panel controls, etc.). The computing platform 104 may also drive or otherwise communicate with one or more displays 122 configured to provide visual output to vehicle occupants by way of a video controller 120. In some cases, the display 122 may be a touch screen further configured to receive user touch input via the video controller 120, while in other cases the display 122 may be a display only, without touch input capabilities. The computing platform 104 may also drive or otherwise communicate with one or more speakers 126 configured to provide audio output to vehicle occupants by ways of an audio controller 124.

The computing platform 104 may also be provided with a navigation module 110, configured to calculate routes responsive to various inputs and provide navigation information and instruction. For traditional vehicle, the navigation module 110 may be configured to output navigation instructions to the driver via the display 122 and the speaker 126. In case of an autonomous vehicle, the navigation module 110 may be configured to feed the navigation instructions directly to an autonomous driving control module (not shown) to enable the autonomous driver of the shuttle 102.

The computing platform 104 may also be provided with an atmosphere controller 114 configured to control and adjust interior atmosphere of the shuttle 102. As an example, the atmosphere controller 114 may be configured to control interior light 116 to adjust to various brightness, color, and color temperature to adapt to various themes of a route. Additionally, the atmosphere controller 114 may be configured to control a fragrance disperser 118 to simulate and disperse various scents for various route themes. The fragrance disperser 118 may be configured to perform olfactory management functions including fragrance dispersal as well as odor removal, odor mashing and etc. For instance, when a route theme is related to coffee shops, the fragrance disperser 118 may be configured to create a coffee shop atmosphere by simulating and dispersing a scent resembling coffee smell to enhance the route theme. In addition to the scent, the atmosphere controller 114 may be further configured to dim the interior light 116 and adjust the color temperature to a warmer color to simulate a coffee shop environment to further enhance the route theme.

The computing platform 104 may also be provided with WiFi connectivity to passengers via a WiFi module 128. The WiFi module 128 may be configured to provide network connectivity (e.g. Internet) through the TCU 142 connected to the computing platform via the in-vehicle network 140. The TCU 142 may include a wireless modem 144 configured to wirelessly connect to a communication network 150 (e.g. a cellular network) to provide network connectivity to the whole vehicle system 132.

To order shuttle service and reserve a seat, a passenger 186 may launch a mobile application 182 installed on a mobile device 180, and send an order to a remote server 160. The order information is them transferred to the computing platform 104 of the shuttle 102 through the communication network. The order may include information such as the passenger's pickup location, drop-off location and pickup time so that the shuttle 102 can plan a route.

In addition to the order information, the mobile application 172 may also send preference data 184 by the passenger 186 that is stored with the mobile application 182. The preference data 184 may be collected using the mobile application 182 when the passenger 186 previously ordered the shuttle services. Additionally or alternatively, the preference data 184 may be collected from a third party using information associated with the specific passenger 186. Alternatively, the preference data 184 may be stored in a cloud-based manner in the server 160.

A local business 170 may make advertising offers using an advertising application 172 to the shuttle 102 to advertise to passengers of shuttle 102 at a particular time. For example, the advertising application 172 may be an application installed on a mobile device (e.g. a mobile phone), or any type of computer. Additionally and alternatively, the advertising application 172 may also include a webpage allowing the business 170 to login and make offers. The offer information may be sent to the computing platform 104 of the shuttle 102 via the communication network 150, and the computing platform 104 may negotiate contracts with the business 170 having received the offer.

Figure 2:
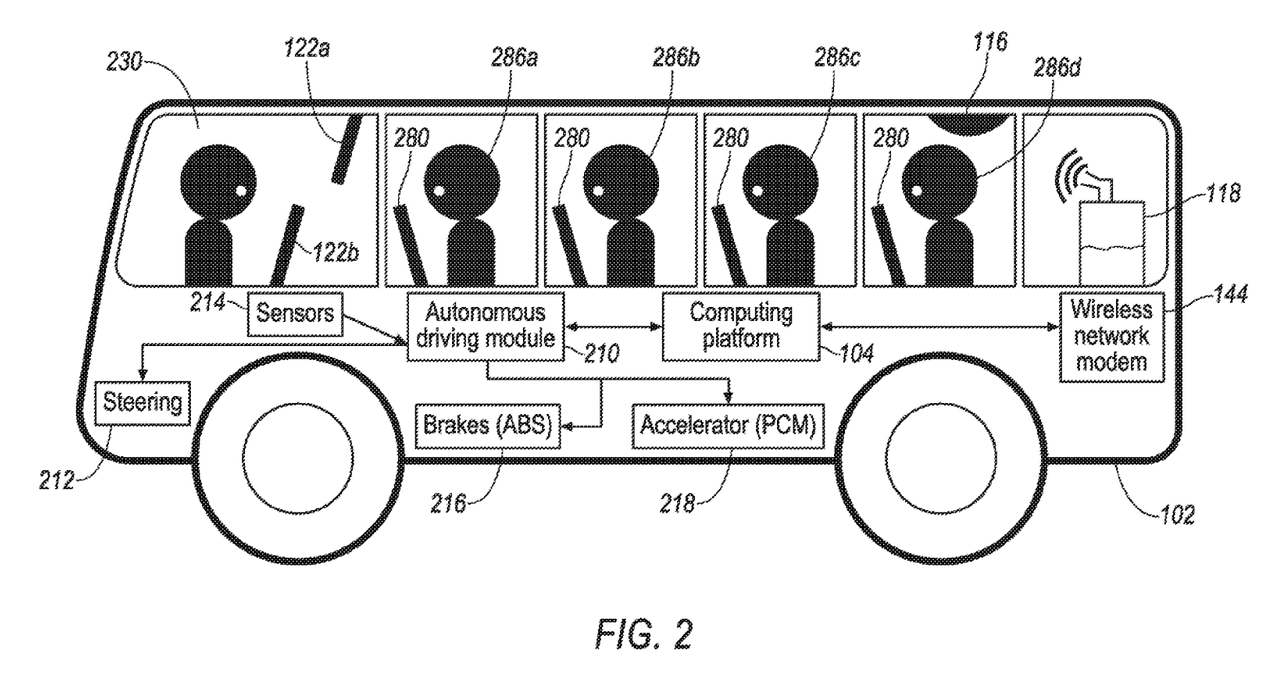
FIG. 2 illustrates a schematic block diagram of a shuttle vehicle of one embodiment of the present disclosure.

Referring to FIG. 2, a schematic diagram of the shuttle vehicle 102 of one embodiment of the present disclosure is illustrated. With continuous reference to FIG. 1, the shuttle 102 may be operated by a driver 230 and have multiple passengers 286 onboard. Each passenger 286 has a mobile device 280 connected to the WiFi module 128 of the computing platform 104. The WiFi module 128 provides mobile devices 280 with network connectivity via the wireless network modem 144 connected to the computing platform 104 via the in-vehicle network 140. Multiple displays 122 may be included in the shuttle 102 to display information to both the driver 230 and the passengers 286. As illustrated in FIG. 2, the display 122a is for passengers 186 and the display 122b is for the driver 230. In addition, the displays 122 may have speakers 126 installed and configured to output both video and audio information.

As an example, the shuttle 102 may be an autonomous vehicle controlled by an autonomous driving module 210 connected to the computing platform 104 via the in-vehicle network 140. The autonomous driver module 210 may be connected to various components including sensors 214, a steering module 212, a brakes module 216, and an accelerator module 218 to operate the shuttle 102. Navigation information and instructions generated by the navigation module 110 are sent to the autonomous driver module 210 to enable and/or facilitate the autonomous driver. Alternatively, the human driver 230 may manually operate the shuttle 102 using navigation information and instructions from the computing platform 104 displayed on display 122b.

As illustrated in FIG. 2, interior lights 116 and the fragrance disperser 118 controlled by the atmosphere controller 114 may be located inside the shuttle 102 at the back to create interior atmosphere. The location of the interior lights 116 and the fragrance disperser 118 illustrated in FIG. 2 are merely examples and they can be located anywhere inside the shuttle cabin to create the desired atmosphere. For instance, the interior lights 116 may be located near the floor of the cabin; the fragrance disperser 118 may be located in the middle section having multiple dispersing holes throughout the shuttle cabin to more evenly disperse the scent. In addition, other than the interior lights 116 and fragrance disperser 118, the atmosphere controller 114 may be connected to more components illustrated or not illustrated in FIGS. 1 and 2, to further enhance the atmosphere control. For instance, the atmosphere controller 114 may also be configured to control an interior audio system of the shuttle 102 and output different audio sounds and/or music to further enhance the atmosphere.

For example, to create the mood for coffee in the fall one might create a morning ambience. The air temperature would be a little cool, humidity a little elevated, overhead lights blue to simulate the blue morning sky and red light from one direction near the horizon to simulate the rising sun. The slight sound of crashing waves can be used in the background sounds from the audio system and a smellscape of the seashore dispensed from the fragrance dispenser. This sets a mood that is pleasant for shuttle riders, but as the shuttle approaches a stop near a coffee shop the odor of coffee is also dispensed as part of a promotion by the coffee shop. This is based on the notion that environmental priming can influence behavior.

In addition, there may be a short-term effect for a single ride and a cumulative effect over many rides. Riders who are busy talking, reading, watching media, etc. may become aware of the approaching stop by the odor the fragrance dispenser emits as the stop approaches. This is a much less intrusive way to inform passengers of an event such as an approaching stop than an announcement, and it gets the passengers prepared to disembark in advance to reduce dwell-time at the stop and reduce problems like forgetting personal property on the shuttle. This is a process called olfactory priming.

Figure 3:
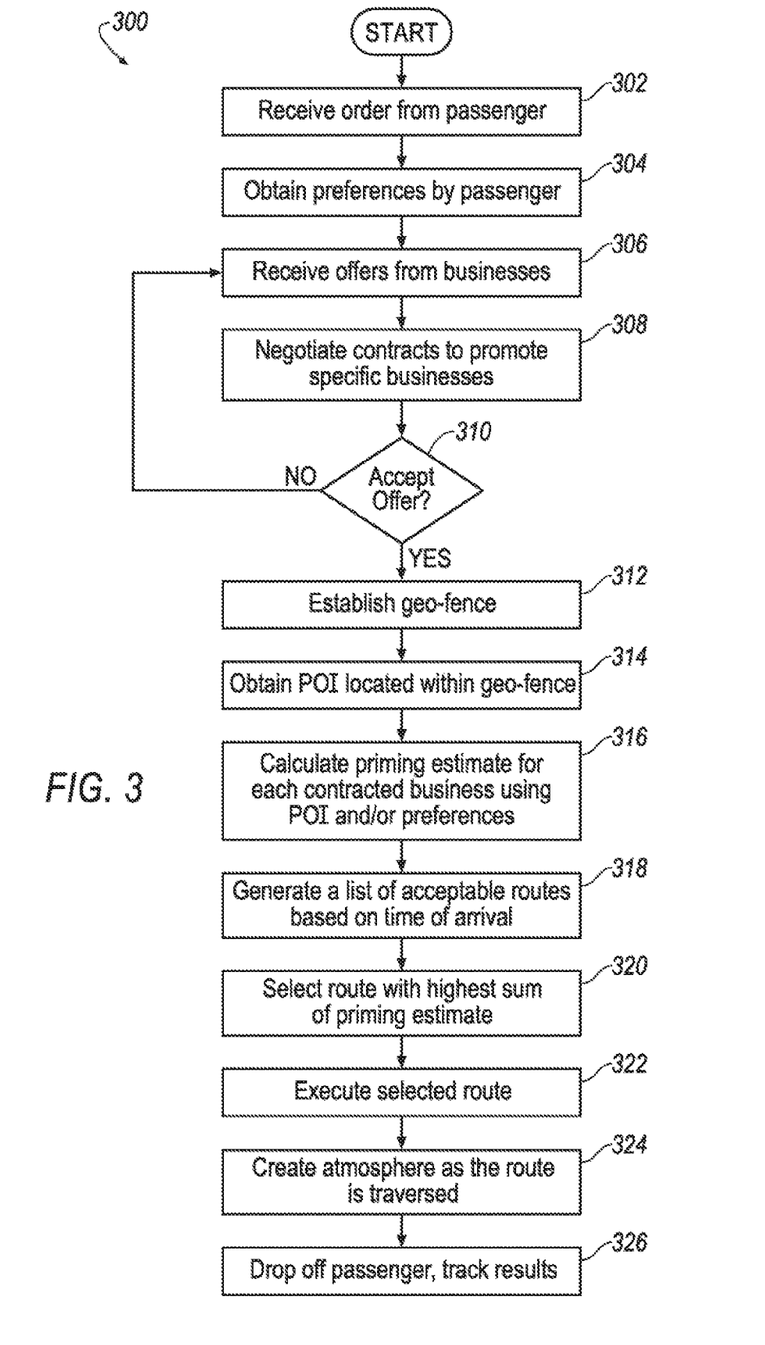
FIG. 3 illustrates an example flow diagram for shuttle advertising of one embodiment of the present disclosure.

Referring to FIG. 3, an example flow diagram of a process 300 for shuttle advertising of one embodiment of the present disclosure is illustrated. At operation 302, the computing platform 104 receives order information from the passenger 186. The processor 106 may be configured to process the order using the vehicle application 134 stored in the storage 112. As an example, the order information includes a pickup location, a drop-off location and optionally a pickup time. The passenger 186 may place the order using the mobile device 180 by sending the order information using the mobile application 182. Responsive to the order from the passenger 186, at operation 304, the computing platform 104 may obtain preference data by the passenger 186 from the mobile application 184. As discussed above, the preference data may be collected from previous activities of the passenger 186. Additionally or alternatively, the preference data may be collected from a third party using information associated with the specific passenger 186. Alternatively, the preferences may be stored on the remote server 160 and sent to the computing platform 104 directly therefrom.

At operation 306, the computing platform 104 receives advertising offers from the local business 170. As an example, the offer may include a business location, advertising time and an offer price. The local business 170 may make the offer using the advertising application 172 and manually input the offer information. Alternatively, some offer information, such as the business location, may have been previously recorded and stored in the server 160, and the server 160 may load and send the information to the computing platform 104 directly.

Having received information from both the passenger 184 and the local business 170, at operation 308, the computing platform 104 may start to negotiate a contract with the business 170 and decide whether to accept the offer. As an example, for better advertising/promoting results, the computing platform 104 may be configured to only consider offers from businesses within a certain distance from the drop-off location. This is because passengers 286 are more likely to purchase from businesses closer to their drop-off locations. For instance, the computing platform may be configured to reject offers from a business that no drop-off location is within three hundred meters from the offering business. It is noted that there are likely to be multiple passengers 286 on the shuttle each ride, and therefore there will likely be more than one drop-off location. Every drop-off location may be considered. In addition, the shuttle 102 may perform multiple rides in a time period (e.g. one hour), especially in the rush-hour which further increases drop-off location possibilities. Alternatively, to maximize the advertising opportunity, every offer is considered regardless of the business location from the drop-off locations.

The advertising application 172 may be further configured to allow the business 170 to specify a time frame of the intended advertisement. For instance, at 9 am, the business 170 may submit an offer to advertise between 11 am and 12 pm, near lunch hours. The computing platform 104 may use that time frame to match offers sent from passengers. Following the above example, the passenger 186 may order the shuttle service to pick him up at around 11 am and the drop-off location is near the business 170 within the three-hundred-meter limit. In this case, there is a match and the computing platform 104 may proceed to negotiate a contract with the business 170. The computing platform 104 may accept the offer and enter into a contract with the business 170. Alternatively, the computing platform 104 may make a counter-offer to the business 170. As an example, the counter-offer may specify a higher price or a different time frame. At operation 310, if the original offer or counter-offer is not accepted, the processes returns to operation 306. Otherwise, if one of the offers is accepted, a contract is made and the process continues to operation 312.

As an example, the contract negotiation and offer acceptance may be performed by the computing platform 104 using the vehicle application 134 automatically without human involvement. Additionally or alternatively, a human driver may intervene before a contract is made to modify and/or approve contract terms. In some cases, due to the uncertainty of rides, the computing platform 104 may be given options to alter or cancel contracts after they are made.

At operation 312, the computing platform 104 establishes a geo-fence for route planning using the pickup and drop-off locations. The geo-fence may include all pickup and drop-off locations of a ride, but its size should be kept relatively small to avoid unnecessary processing burden. The computing platform 104 is configured to only plan routes within the geo-fence. The geo-fence may be created using the vehicle application 134, or alternatively, at the server 160.

At operation 314, the computing platform 104 loads information of points-of-interest (POIs) located within the geo-fence from a POI database. POIs may include any business, attraction, historical site, transportation and etc. For instance, POIs may include coffee shops, restaurants, museums, banks, rental apartments, gift shops, apparel shops, theaters, cinemas, etc. As an example, the POI database may be cloud-based located in the server 160. This configuration allows the computing platform 104 to load the most updated POIs at any time. Alternatively, the POI database may be locally stored in the storage 112 of the computing platform 104. Compared to the cloud-based POI database, this configuration allows the computing platform 104 to load the POIs in a more reliable and faster fashion. The POI database stored locally in the storage 112 may be updated occasionally via the communication network 150 through the TCU 142.

At operation 316, the computing platform 104 calculates a priming estimate for each contracted business using POIs within the geo-fence and preferences by the passengers 286. The priming estimates come from the idea that passing by or presenting POIs of a certain type may prime/influence passengers to purchase from that specific or related type of business. For instance, having seen a couple of coffee shops along the route, passengers 286 will probably be influenced by what they have seen and be more likely to purchase coffee at the end of their ride after getting off the shuttle. In other words, to promote a coffee shop near a drop-off location, the shuttle may simply drive past other coffee shops and allow passengers to see those coffee shops to psychologically influence their purchase decision which may be measured using, for example, coupons that track the individual's actual behavior. Therefore, POIs of the same or similar type as the advertising business should have higher priming estimates than POIs of different type because they are more likely to influence the passengers' purchase decision. In addition, the psychological influence may be further enhanced by creating a correct atmosphere inside the bus through the atmosphere controller 114. For instance, it is the potential economy advantage of the psychological priming produced by the odor. The priming estimate is made by a learning system that compares the estimated effect with the actual effect on the individuals affected. For instance, the learning system may compare the person's known affinity for a product without the priming factor and with various priming factors to determine the priming estimate. An example of priming estimates is illustrated in Table 1 below.

TABLE 1

| Advert. Buss. Type | POIs | | | | |
|---|---|---|---|---|---|
| | Coffee shops | Restaurants | Apartments | Banks | Others |
| Coffee shops | 2 | 1 | 0 | 0 | 0 |
| Restaurants | 1 | 2 | 0 | 0 | 0 |
| Apartments | 0 | 0 | 2 | 0 | 0 |

As illustrated in Table 1, when the contracted advertising business is a coffee shop, all coffee shop POIs located within the geo-fence will be given a high priming estimate, such as 2. Restaurant POIs will be given a priming estimate of 1 because their type is similar to coffee shops but not exactly the same. That is, coffee shops share more come common characteristics with other coffee shops as compared with restaurants. Others will be given 0 priming estimate because they are unlikely to influence the passengers. When the contracted advertising business is a restaurant, coffee shop and restaurant POIs will be given 1 and 2 priming estimates respectively. When the advertising business is an apartment, only the apartment POIs will be given a priming estimate of 2 for the same reasons as above. For instance, tables such as Table 1 can be made for each individual and combined to make a table for the entire serviceable market. So in this concept the priming estimate may be adaptable to different serviceable markets.

In addition to the type of business used for priming, passengers' 286 own preferences are also considered. The idea is that passengers 286 previously purchased from a certain type of business is more likely to be primed than those who did not previously purchase from that type of business. Using the above coffee shop example, if one or more passengers 286 of a ride have a preference of coffee shops, the coffee shop POIs should be given more priming estimates. For instance, if one of the passengers 286 has a preference of coffee shops, each coffee shop POI should be given a priming estimate of 3; if two of the passengers 286 have preferences of coffee shops, each coffee shop POI should be given a priming estimate of 4; and so on. The above calculations are merely examples and different algorithms and weights may be used to assign priming estimates to POIs.

Having calculated priming estimates, the process proceeds to operation 318. The computing platform 104 generates a list of acceptable routes based on time of arrival at drop-off locations. Alternatively, the list of acceptable routes may be generated at the remote server 160 and downloaded to the computing platform 104. The acceptable route may not go beyond the geo-fence generated at operation 212.

At operation 320, having generated the priming estimates of each POI and the list of acceptable routes, the computing platform 104 calculates a sum of priming estimates for each route and select the route with the highest sum of priming estimate. As discussed above, the route with the highest sum of priming estimate is more likely to influence passengers' 286 purchase decision at the business near the drop-off location. As an example, the computing platform 104 may be configured to automatically select the route without human intervention using the method above. Additionally or alternatively, the computing platform 104 may allow the human driver 230 to make the final decision on which route to select, or change the automatically selected route due to reasons beyond the computing platform 104.

At operation 322, the selected route is executed. If the shuttle 102 is an autonomous vehicle, the autonomous driver module 210 may then execute the selected route sent from the computing platform 104. If the shuttle 102 is a conventional vehicle, the computing platform 104 may give navigation instructions to the driver 230 to execute the selected route.

At operation 324, the computing platform 104 creates an atmosphere inside the shuttle 102 as the route is traversed to further enhance the priming to passengers 286. As discussed above, an atmosphere controller 114 may be configured to control the interior lights 116 and the fragrance disperser 118 to create an atmosphere corresponding to the theme of the selected route. In addition, other priming factors such as sight, sound, air quality, vibration and olfactory priming may be combined. As an example, if the theme of the selected route is about coffee shops, the interior lights may be dimmed and adjusted to a dark brown color, and the fragrance disperser may be configured to simulate and disperse a scent with coffee smell to simulate an atmosphere inside a coffee shop. As a part of the atmosphere simulation, the computing platform may be further configured to provide introductions of POIs along the selected route using the display 122 and/or speaker 126 to further enhance the priming to the passengers 286. Additionally or alternatively, the computing platform 104 may provide information of those POIs on mobile devices 280 via the WiFi module 128. As an example, the computing platform 104 may be configured to obtain a vignette about each POI from the POI database and display the data to the passengers 286 as the route is traversed. The computing platform 104 may further be configured to distribute digital coupons of the advertising business to the passengers 286 using the mobile devices 280. The coupons may be later used for tracking whether the passengers purchase from the business. Near the end of the route, the computing platform 104 may explicitly advertise the contracted business using the display 122 or mobile device 280.

At operation 326, the shuttle 102 stops at the destinations to drop off passengers. In addition, the computing system may track whether the passengers purchase from the advertised business by tracking the coupons digitally distributed, and update the passengers' preferences accordingly.

Computing devices described herein, generally include computer-executable instructions where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Visual Basic, JavaScript, Python, JavaScript, Perl, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined not with reference to the above description, but with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An advertising method for a shuttle, comprising:
by a controller,
responsive to identifying a drop-off location and an advertising business paying to influence a route travelled by the shuttle, selecting one of a plurality of routes to the drop-off location according to a priming estimate indicating that the one selected route is associated with a highest number of points of interests (POIs) of the same type as the advertising business relative to others of the plurality of routes, wherein none of the POIs is the advertising entity;
confining the plurality of routes to a geo-fence defined by the drop-off location; and
commanding the shuttle to travel the one selected route.

2. The method of claim 1 wherein the identifying the advertising business includes selecting the advertising business from a plurality of advertising businesses each offering to pay to influence the route of the shuttle according to a distance between the drop-off location and a location of the advertising business.

3. The method of claim 1 wherein the identifying the advertising business includes selecting the advertising business from a plurality of advertising businesses each offering to pay to influence the route of the shuttle according to an amount offered.

4. The method of claim 1 further comprising dispensing a scent selected by the advertising business on the shuttle during the travel.

5. The method of claim 1 further comprising displaying advertisements for the advertising business on the shuttle during the travel.

6. A routing server for a shuttle, comprising:
a controller programmed to,
responsive to identifying a drop-off location for a passenger, a preference of the passenger, and a business paying to influence a route travelled by the shuttle, select one of a plurality of routes to the drop-off location according to the preference and a priming estimate indicating an extent to which points of interest (POIs) along the one selected route share characteristics with the business relative to others of the plurality of routes, wherein the POIs are not the business,
provide instructions to the shuttle such that the shuttle travels the one selected route, and po2 provide instructions to the shuttle such that the shuttle displays advertisements for the business during the travel.

7. The server of claim 6 wherein the identifying the business includes selecting the business from a plurality of businesses each offering to pay to influence the route of the shuttle according to a distance between the drop-off location and a location of the business.

8. The server of claim 6 wherein the identifying the business includes selecting the business from a plurality of businesses each offering to pay to influence the route of the shuttle according to amounts offered.

9. The server of claim 6 wherein the controller is further programmed to provide instructions to the shuttle such that the shuttle dispenses a scent selected by the business during the travel.

10. The server of claim 6 wherein the controller is further programmed to confine the plurality of routes to a geo-fence defined by the drop-off location.

11. The server of claim 6 wherein the instructions define navigation commands.

12. The server of claim 11 wherein the navigation commands are autonomous navigation commands.

\* \* \* \* \*